United States Patent [19]

Sjärne et al.

[11] Patent Number: 5,062,505
[45] Date of Patent: Nov. 5, 1991

[54] BRAKE BLOCK HOLDER ARRANGEMENT

[75] Inventors: Anders O. G. Sjärne, Rättarev; Sven-Olof Larsson, Bästemansg, both of Sweden

[73] Assignee: SAB Nordic AB, Landskrona, Sweden

[21] Appl. No.: 511,338

[22] Filed: Apr. 19, 1990

[30] Foreign Application Priority Data

Apr. 27, 1989 [SE] Sweden .............................. 8901537-4

[51] Int. Cl.$^5$ ........................ B60T 11/10; B61H 1/00
[52] U.S. Cl. .................................. 188/153 R; 188/74; 188/234; 188/206 R
[58] Field of Search ........... 188/153 R, 205 R, 206 R, 188/209, 222.1, 234, 74, 223.6, 235, 233.3

[56] References Cited

U.S. PATENT DOCUMENTS

| 3,447,647 | 6/1969 | Stipanovic | 188/153 R |
| 4,287,968 | 9/1981 | Stensson et al. | 188/153 R X |
| 4,378,864 | 4/1983 | Stjärne | 188/153 R |
| 4,630,714 | 12/1986 | Stjärne et al. | 188/206 R |

Primary Examiner—Douglas C. Butler
Attorney, Agent, or Firm—Laurence R. Brown

[57] ABSTRACT

A brake block holder arrangement comprises a brake block holder (7) receiving a brake force from an axially movable push rod (2) of a brake actuator (1) and being pivotally attached to brake block hangers (5), which are suspended from a suspension bracket (4) on the actuator. A push rod head (3) on the push rod is in direct contact with a generally tube-shaped portion of the brake block holder around its shaft (8) for pivotal connection to the hangers. For accomplishing guiding and torque transmission the push rod head has extensions (11, 12) with a width corresponding to the distance between the side-walls (7') of the brake block holder, one of the extensions being provided with a laterally movable cross piece (19) for toothed engagement with rotatable segments (16) in the inner surfaces of the side-walls.

1 Claim, 3 Drawing Sheets

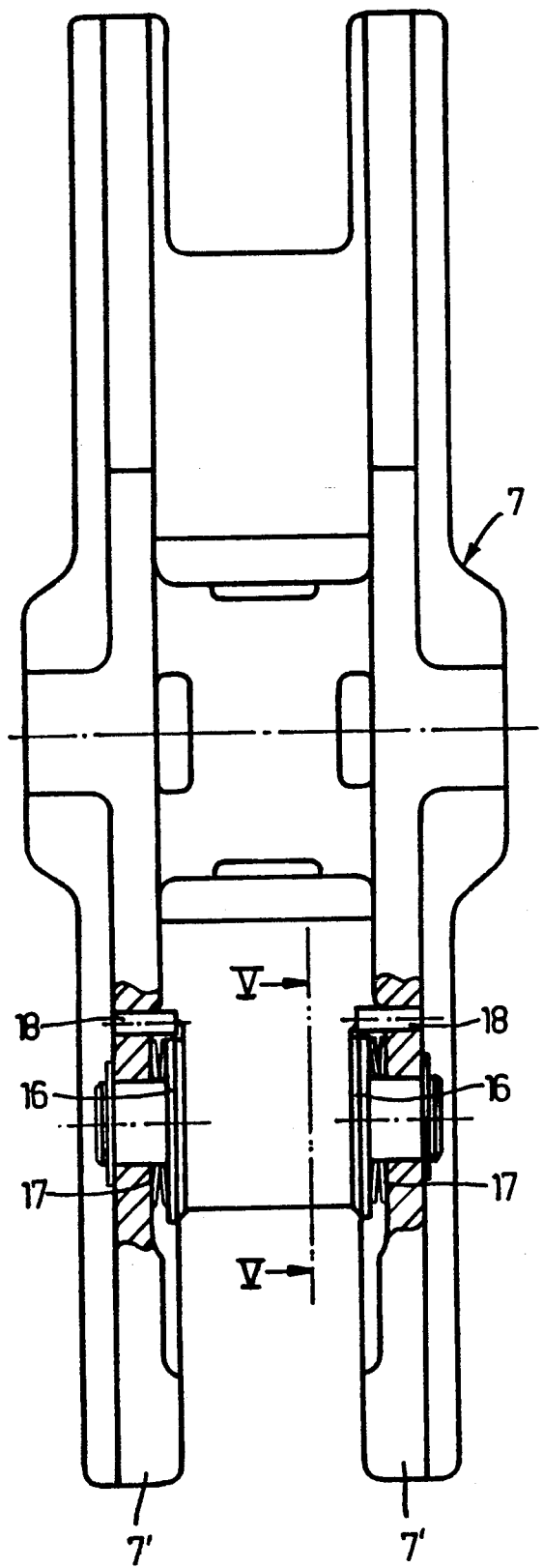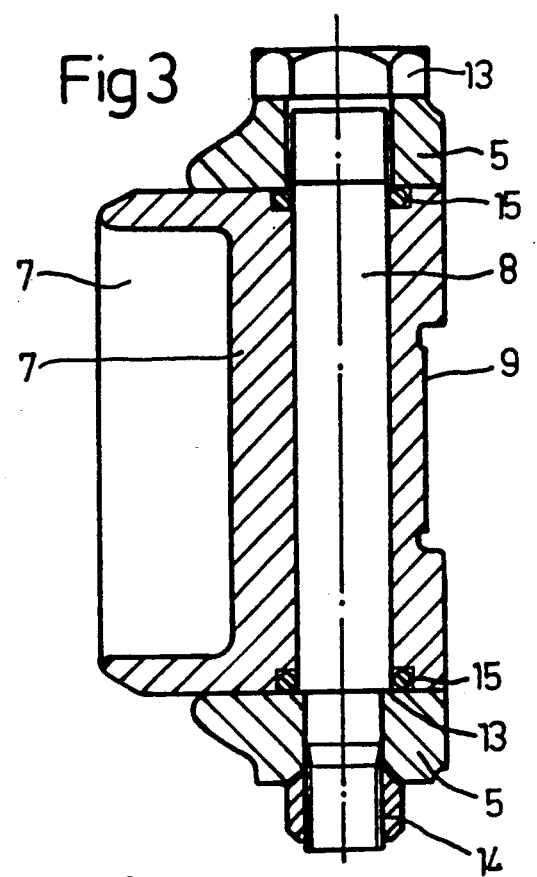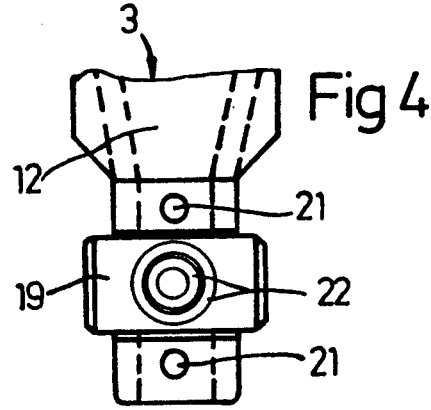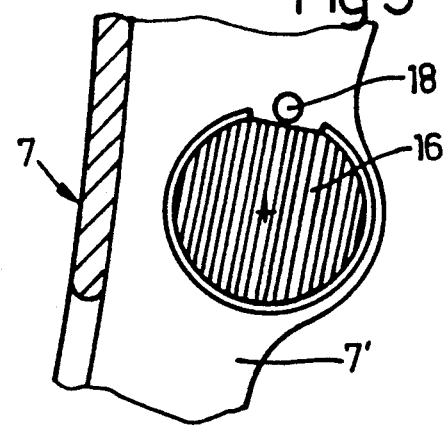

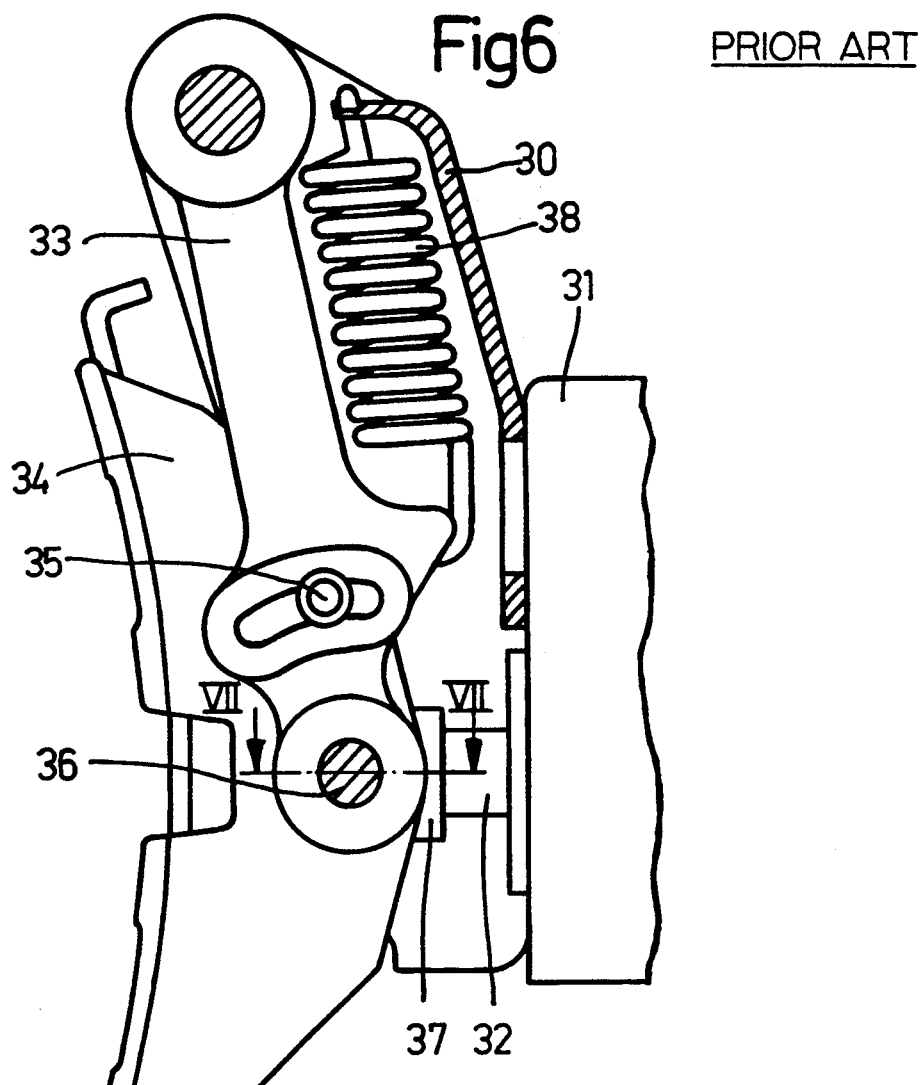
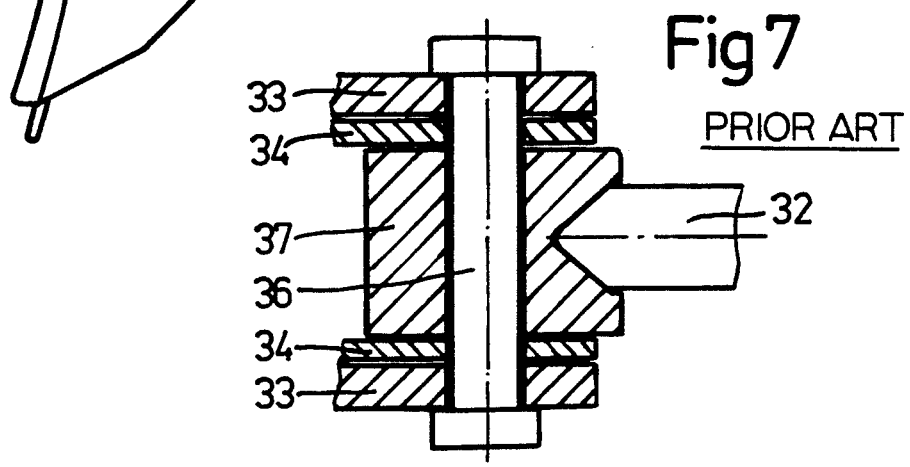

BRAKE BLOCK HOLDER ARRANGEMENT

TECHNICAL FIELD

This invention relates to a brake block holder arrangement, comprising a brake block holder for transmitting an axial brake force from an axially movable push rod of a brake actuator and being pivotally attached to brake block hangers, which are suspended from a suspension bracket on the actuator, wherein the brake force is transmitted from the push rod via a push rod head thereon in direct contact with a generally tube-shaped portion of the brake block holder around its shaft for pivotal connection to the hangers. The arrangement is primarily intended for use on a rail vehicle.

BACKGROUND OF THE INVENTION

An arrangement of the above general kind is disclosed in U.S. Pat. No.-A-3 447 647, whereby a space-saving reduction of the distance from the end of the push rod to the brake block holder surface accomodating the brake block is attained. Such a reduction is of great importance in many cases, as the space available on modern rail vehicles for brake actuators with brake block holders often is extremely limited.

A more conventional arrangement without this space-saving reduction is shown in DE-C-1 809 556, where the push rod has a tapering or V-shaped end force-transmittingly cooperating with a corresponding groove in a cube, which is arranged on the shaft pivotally connecting the brake block holder to the brake block hangers.

In this conventional arrangement the guiding and torque transmission between the push rod and the brake block holder is provided by the cooperation betwen the V-shaped push rod end and the corresponding groove in the cube, whereas there is a friction device between the brake block holder and the brake block hangers for keeping the brake block holder in a proper position for braking cooperation with a wheel to be braked. However, with this conventional design the brake block holder will follow the brake block hangers in their arcuate movements.

THE INVENTION

In an arrangement of the type first described the guiding and torque transmission can according to the invention be attained in that the push rod head has an upper and a lower extension with a width corresponding to the distance between the side-walls of the brake block holder and in that one of the extensions is provided with a laterally movable cross piece having toothed end surfaces for cooperation with spring biassed toothed segments, rotatably arranged in the inner surfaces of the brake block holder side-walls.

BRIEF DESCRIPTION OF THE DRAWINGS

The invention will be described in further detail below reference being made to the accompanying drawings, in which FIG. 2 is a front view (from the right in FIG. 1) of the brake block holder being a part of the suspension shown in FIG. 1, FIG. 3 is a section along the line III—III in FIG. 1 through the brake block holder, FIG. 4 is a detail view along the line IV—IV in FIG. 1, and FIG. 5 is a detail view along the line V—V in FIG. 2, FIGS. 2-5 being to a larger scale than FIG. 1, FIGS. 6 and 7 are a side view and a section along the line VII—VII in FIG. 6, respectively, of a prior art suspension.

DETAILED DESCRIPTION OF A PREFERRED EMBODIMENT

Figure 1:
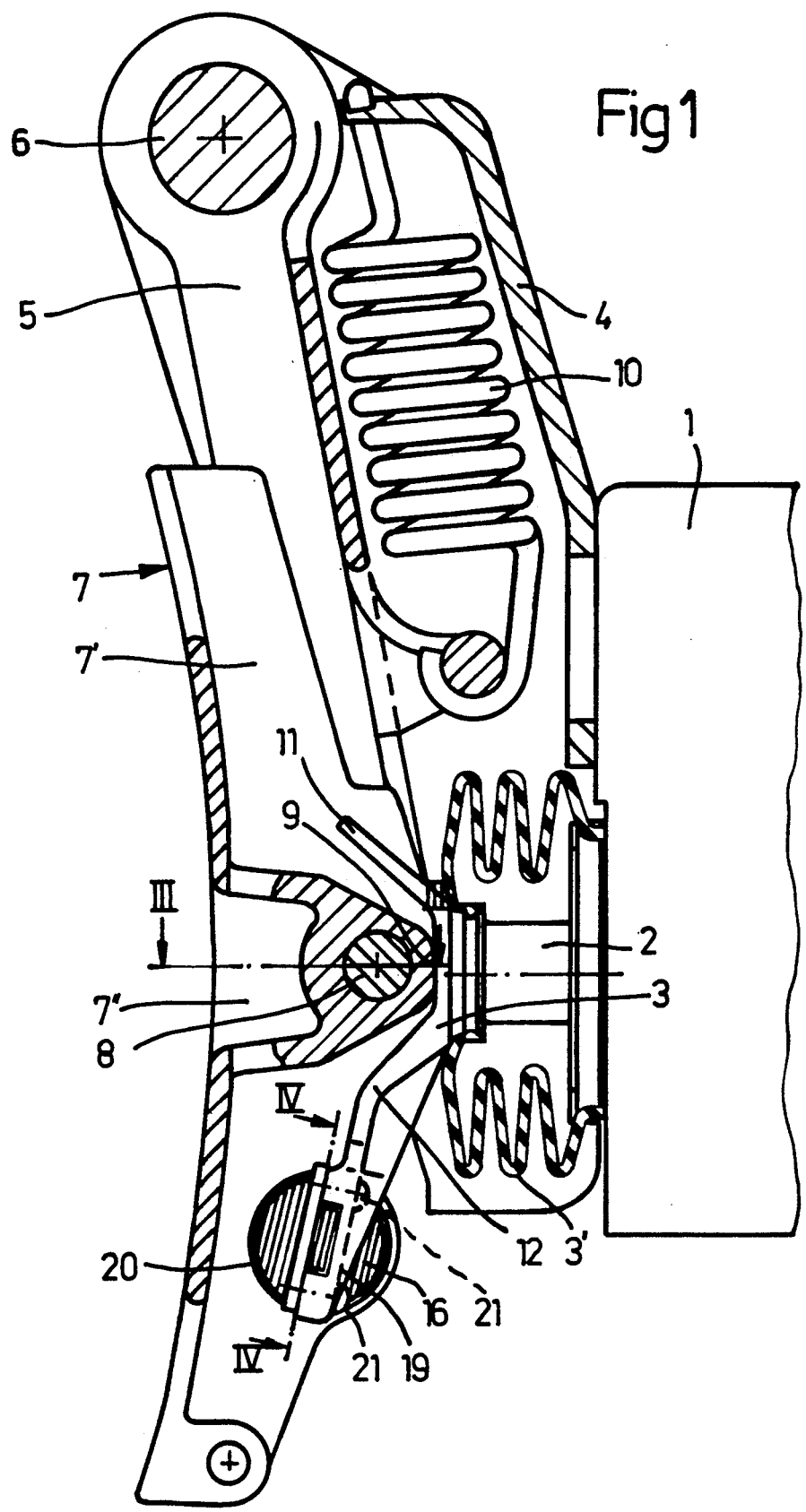
FIG. 1 is a side view, partly in section, of a brake block holder suspension according to the invention.

A conventional rail vehicle brake unit or brake actuator 1 is provided with an axially movable push rod 2, as is well known in the art. Integral with the push rod 2 is a push rod head 3 to be described below. A rubber bellows 3' is arranged between the brake unit 1 and the push rod head 3.

A suspension bracket 4 is attached to the brake unit 1. A divided brake block hanger 5 is pivotally arranged in the bracket 4 by means of a shaft 6. A brake block holder 7 is pivotally attached to the brake block hanger 5 by means of a shaft 8, which is to be further described below under reference to FIG. 3. The shaft 8 extends through a generally tube-shaped portion of the brake block holder 7, as most clearly appears from FIG. 1.

The brake block holder 7 is provided with an arcuate or cylindrical rear surface 9 in force transmitting contact with the push rod head 3. A draw spring 10 is arranged between the bracket 4 and the hanger 5 to keep the surface 9 in constant contact with the push rod head 3. As an alternative, the push rod 2 and the brake block holder 7 may be flexibly interconnected by for example a rubber band. In a conventional way the brake block holder 7 is to be provided with a replacable brake block, which is not shown in the drawings.

The push rod head 3 has a substantially planar surface in contact with the cylindrical surface 9 of the brake block holder 7. The head 3 has an upper extension 11 and a lower extension 12. The width of these two extensions 11 and 12 corresponds to the inner distance between two side-walls 7' of the brake block holder 7. In this way an advantageous guiding and torque transmission between the push rod 2 and the brake block holder 7 is obtained.

As shown in FIG. 3, the pivotal connection between the brake block hangers 5 and the brake block holder 7 has the following design:

Generally speaking, the shaft 8 is a cylindrical part of a screw 13, which has a threaded portion near its head for play-less engagement with an internal thread of the upper hanger 5 in FIG. 3. At the lower hanger 5 in FIG. 3 the screw 13 has a shoulder 13' for the lower hanger 5, so that the brake block holder 7 may pivot between the two hangers 5. At its end extending out of the lower hanger 5 the screw is provided with a thread, with which a conical nut 14 engages for eliminating the play with the hanger 5 and accordingly the need for a separate bushing, adding to the volume. Sealing O-rings 15 are arranged around the screw 13 at each end of the brake block holder 7.

Each side-wall 7' of the brake block holder 7 is provided with an internal, rotatable, toothed segment 16. The segments 16 are biassed towards each other by springs 17. A pin 18 arranged in the wall 7' and cooperating with a circumferential notch in the segment 16 has the effect that the segment can only rotate a small angular distance and has the right position for its intended function to be described below.

Cooperating with the toothed segments 16 is a cross piece 19, which is laterally movably arranged towards the end of the lower extension 12 of the push rod head 3. The extension 12 is provided with a transverse groove intended for the cross piece 19 and covered by a lid 20, which is attached by means of screws or rivets 21. The cross piece 19 is provided with O-rings 22 or the like for reducing play and thus wear. The two ends of the cross piece 19 are provided with teeth for cooperation with the teeth of the segments 16, and the length of the cross piece 19 is slightly larger than the distance between the segments 16 in their rest position as shown in FIG. 2. As an alternative, the arrangement may be provided at the upper extension 11.

The advantages with this toothed arrangement are that high frequencies and small amplitude movements will not cause undesired mutual slip and that a distinct power is required to shift teeth engagement. This also means that the springs 17 can be less space requiring than otherwise.

At each brake application the brake block holder 7 will be pushed forward (to the left in FIG. 1) by the push rod 2 with its head 3. The movement of the push rod 2 is axial, whereas that of the brake block holder 7 is arcuate due to its suspension. The surface 9 will accordingly slide on the planar surface of the head 3. The brake block holder 7 is guided by the extensions 11 and 12 of the head 3. By the engagement with the wheel to be braked the brake block holder 7 will adopt a certain position, and any changed position is made possible by relative movements between the toothed surfaces of the cross piece 19 and the segments 16. The position attained is then maintained at least until the next brake application.

A prior art arrangement is shown in FIGS. 6 and 7. Many parts are similar to those depicted in FIG. 1, and only a brief description is given. A suspension bracket 30 is attached to a brake unit 31 having an axially movable push rod 32. Brake block hangers 33 are pivotally suspended from the bracket 30, and a brake block holder 34 is pivotally attached to the hangers 32, a conventional friction device 35 being arranged between the hangers 33 and the brake block holder 34, which means that the holder 34 follows the hangers in their arcuate movements.

As appears from FIG. 7, the pivotal connection between the hangers 32 and the brake block holder 34 is by means of a shaft 36, on which also a cube 37 is arranged between the two legs of the holder 34. At one surface the cube 37 is provided with a V-shaped groove for force transmitting cooperation with the V-shaped end of the push rod 32. Constant contact between the cube 37 and the push rod 32 is guaranteed by a spring 38. By this force transmitting arrangement the push rod 32 provides lateral guiding for the brake block holder 34, which still can perform its arcuate movement in spite of the axial movement of the push rod.

In this prior art arrangement the two legs of the brake block holder 34 are substantially planar, and each leg is provided with a rather big notch for a mounting projection on the brake block (not shown) to be releasably attached to the brake block holder. In order to obtain the necessary strength and stability for the brake block holder 34 the distance between the hole for the shaft 36 and the notch must be quite substantial.

In order to minimize the width of the brake block holder 7 according to the invention along the axis of the push rod 2 retaining the necessary strength and stability (i.e. moment of inertia) the material thickness of the brake block holder 7 is increased, as appears from FIG. 2, in this main force transmitting region, and the notch 7″ referred to above is provided with lateral walls. FIG. 3, which is a section through this critical region of the brake block holder 7, clearly shows that the width (or dimension from right to left therein) is minimal taking the depth of the notch 7″ into account. In reality these measures have made it possible to reduce the width (or the distance from the end of the push rod 2 to the brake block holder surface accomodating the brake block) by some 25 mm.

By the cooperation between the segments 16 in the brake block holder 7 and the cross piece 19 associated with the push rod head extension 12 the further advantage of a linear guiding of the brake block holder is obtained.

As appears from FIG. 3 the front surface of the brake block hangers 5 and the brake block holder 7 are slanted so as not to interfere with a wheel flange during braking.

We claim:

1. A brake block holder arrangement, comprising a brake block holder (7) for transmitting an axial brake force from an axially movable push rod (2) of a brake actuator (1) and being pivotally attached to brake block hangers (5), which are suspended from a suspension bracket (4) on the actuator, wherein the brake force is transmitted from the push rod (2) via a push rod head (3) thereon in direct contact with a generally tube-shaped portion of the brake block holder (7) around its shaft (8) for pivotal connection to the hangers, characterized in that the push rod head (3) has an upper extension (11) and a lower extension (12) with a width corresponding to the distance between the side-walls (7') of the brake block holder (7) and that one of the extensions (12) of the push rod head (3) is provided with a laterally movable cross piece (19) having toothed end surfaces for cooperation with spring biassed toothed segments (16), rotatably arranged in the inner surfaces of said brake block holder sidewalls (7').

* * * * *